(12) United States Patent   (10) Patent No.: US 8,894,088 B2
Lark, Jr. et al.   (45) Date of Patent: Nov. 25, 2014

(54) METHODS AND APPARATUS FOR FOLDING VEHICLE CHASSIS

(71) Applicant: Massachusetts Institute of Technology, Cambridge, MA (US)

(72) Inventors: William Lark, Jr., Burbank, CA (US); Nicholas Pennycooke, Herndon, VA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/748,565

(22) Filed: Jan. 23, 2013

(65) Prior Publication Data

US 2014/0202780 A1    Jul. 24, 2014

(51) Int. Cl.
*B62D 21/14*   (2006.01)
*B62D 31/00*   (2006.01)

(52) U.S. Cl.
CPC .............. *B62D 21/14* (2013.01); *B62D 31/006* (2013.01)
USPC ........................................................ 280/639

(58) Field of Classification Search
CPC ...................... B62K 15/006; B62K 2015/005
USPC .................................. 280/638, 639; 180/208
See application file for complete search history.

(56) References Cited

U.S. PATENT DOCUMENTS

| | | | | |
|---|---|---|---|---|
| 3,031,023 | A * | 4/1962 | De La Tramerye et al. | 180/22 |
| 3,850,472 | A * | 11/1974 | Greppi | 296/26.11 |
| 5,937,963 | A * | 8/1999 | Urbanczyk | 180/208 |
| 6,112,843 | A * | 9/2000 | Wilcox et al. | 180/345 |
| 6,267,196 | B1 * | 7/2001 | Wilcox et al. | 180/347 |
| 6,374,934 | B1 * | 4/2002 | Beck et al. | 180/65.51 |
| 6,457,544 | B1 * | 10/2002 | Sung | 180/220 |
| 6,530,445 | B1 * | 3/2003 | Flowers et al. | 180/208 |
| 6,668,959 | B2 * | 12/2003 | McDermott et al. | 180/220 |
| 7,451,848 | B2 * | 11/2008 | Flowers et al. | 180/208 |
| 7,647,998 | B1 * | 1/2010 | Ein | 180/208 |
| 7,673,718 | B2 * | 3/2010 | Asai et al. | 180/208 |
| 7,870,922 | B2 * | 1/2011 | McVicar et al. | 180/209 |
| 8,162,090 | B2 * | 4/2012 | Atherton et al. | 180/208 |

(Continued)

FOREIGN PATENT DOCUMENTS

JP    59149873 A  *  8/1984 ............ B62D 63/02

OTHER PUBLICATIONS

Webpage describing "Renault Zoom Electric City Car Concept 1992", accessed Jan. 23, 2013, http://www.autoconcept-reviews.com/cars_reviews/renault/renault-zoom-concept-1992/cars_reviews-renault-zoom-concept-1992.html.

(Continued)

*Primary Examiner* — Nicole Verley
(74) *Attorney, Agent, or Firm* — Stephen R. Otis

(57) ABSTRACT

In exemplary implementations of this invention, a foldable vehicle has a foldable chassis. The wheelbase (and thus the overall footprint) of the vehicle can be reduced when parking, and can be extended when driving on the open road. In exemplary implementations the ability to shorten and lengthen the wheelbase is achieved by using two 4-bar linkages, activated by one or more linear actuators positioned in parallel. The dual 4-bar linkage and linear actuator(s) can provide: (i) the ability to maintain full maneuverability in the vehicle's folded and unfolded state; (ii) a fail-safe static system, and (iii) a rigid but transformable chassis.

5 Claims, 9 Drawing Sheets

(56) References Cited

U.S. PATENT DOCUMENTS

| | | | |
|---|---|---|---|
| 8,413,753 B2 * | 4/2013 | Wu et al. .................. | 180/208 |
| 2008/0116665 A1 * | 5/2008 | Nakaizumi et al. ........... | 280/638 |
| 2011/0247889 A1 * | 10/2011 | Kosco et al. ................. | 180/208 |

OTHER PUBLICATIONS

Webpage describing "1992 Renault Zoom", accessed Jan. 23, 2013, http://www.carstyling.ru/en/car/1992_renault_zoom/.

Technology Tuesdays: MIT Media Lab's CityCar, webpage dated Aug. 30, 2011, accessed Jan. 23, 2013, http://www.dcsocialite.com/technology-tuesdays-mit-media-labs-citycar.

Frames for times 0:04, 0:55, 1:01, 1:16, 1:18, 1:19 and 1:32, in YouTube video posted Aug. 9, 2011, CityCar Changing Places Group, Changing Places, MIT Media Lab, accessed Jan. 23-24, 2013, http://www.youtube.com/watch?v=jZKWI34N3O0.

* cited by examiner

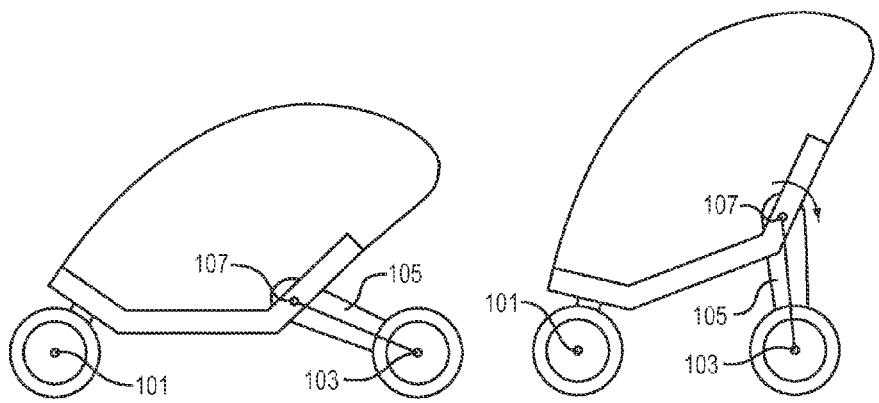
FIG. 1A (PRIOR ART)
FIG. 1B (PRIOR ART)
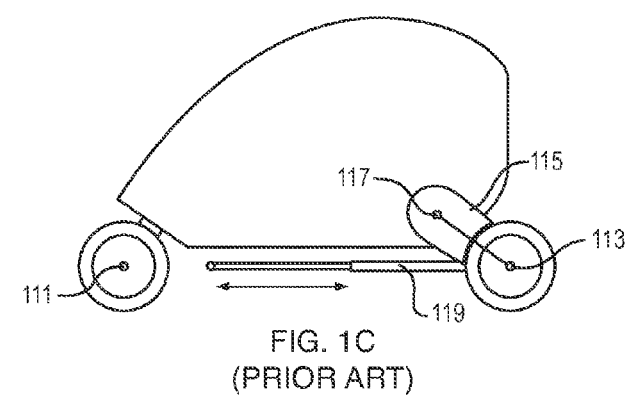
FIG. 1C (PRIOR ART)
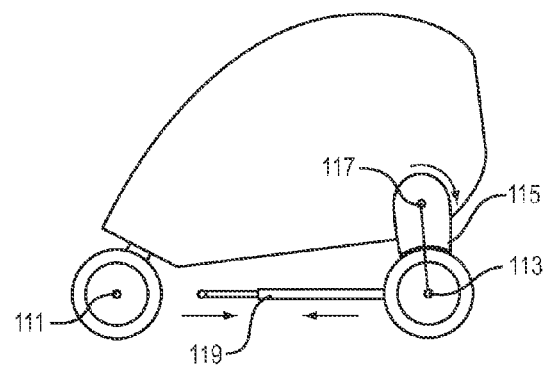
FIG. 1D (PRIOR ART)

METHODS AND APPARATUS FOR FOLDING VEHICLE CHASSIS

FIELD OF THE TECHNOLOGY

The present invention relates generally to vehicles.

SUMMARY

In exemplary implementations of this invention, a foldable vehicle has a foldable chassis. The wheelbase (and thus the overall footprint) of the vehicle can be reduced when parking, and can be extended when driving on the open road.

The ability to shorten and lengthen the wheelbase is achieved by using two 4-bar linkages, activated by one or more linear actuators positioned in parallel. The dual 4-bar linkage and linear actuator(s) can work in unison to "fold" the vehicle (reduce the vehicle's length), so that the vehicle is shorter when it is parked.

The dual 4-bar linkage and linear actuator(s) can provide: (ii) the ability to maintain full maneuverability in the vehicle's folded and unfolded state; (ii) a fail-safe static system, and (iii) a rigid but transformable chassis.

This linkage and actuator configuration may be employed in a vehicle that employs drive by wire in-wheel electric propulsion and steering systems.

This invention has many practical advantages. For example, in exemplary implementations of this invention, a foldable car with dual 4-bar linkage and linear actuator(s) has at least the following eleven advantageous features:

First, the car can fold up to reduce its wheelbase, so that the folded wheelbase is up to 40% less than the total unfolded wheelbase (depending on linkage geometry).

Second, the car can maintain full drive maneuverability during any state of the fold (folded, unfolded, or any state in-between).

Third, goods in rear compartment, as well as batteries in front and rear modules, stay level to the ground because of a relatively consistent angle position of the rear compartment (maximum variation in tilt approximately 5 degrees).

Fourth, the car has reduced energy consumption relative to other folding mechanisms since the majority of mass is not lifted.

Fifth, the car has easy front passenger entry and exit when folded.

Sixth, the car maintains relatively low center of gravity (preserves stability when folded).

Seventh, the mechanical linkage system can help absorb energy from front and rear collisions.

Eighth, the speed and position of fold can be controlled throughout intermediate fold states.

Ninth, the linear actuator(s) in a 4-bar linkage system help maintain chassis rigidity and structural integrity (the linear actuator function as a fifth linkage).

Tenth, non-back-drivable actuator(s) mechanically stabilize the folding system, thereby (i) reducing energy usage; (ii) preventing chassis collapse failure modes, and (iii) allowing the vehicle to be locked (when desired) in various positions (i.e., to operate as an auto-lock $5^{th}$ linkage).

Eleventh, the chassis behaves as rigid body in zero-power/power-failure situation.

The description of the present invention in the Summary and Abstract sections hereof is just a summary. It is intended only to give a general introduction to some illustrative implementations of this invention. It does not describe all of the details of this invention. This invention may be implemented in many other ways. For example, other types of linkages (instead of 4-bar linkages) and other types of actuators (instead of linear actuators) may be employed.

BRIEF DESCRIPTION OF THE DRAWINGS

FIGS. 1A and 1B are diagrams illustrating a prior art folding car concept for a City Car™.

FIGS. 1C and 1D are diagrams illustrating a prior art folding car, the 1992 Renault® Zoom™.

Figure 2A:
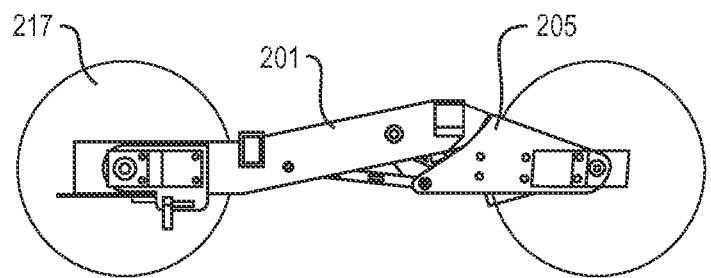
FIGS. 2A, 2B, 2C, 3A, 3B, 3C show side views of a mechanical linkage system in a so-called "asymmetric" prototype of this invention.
Figure 2B:
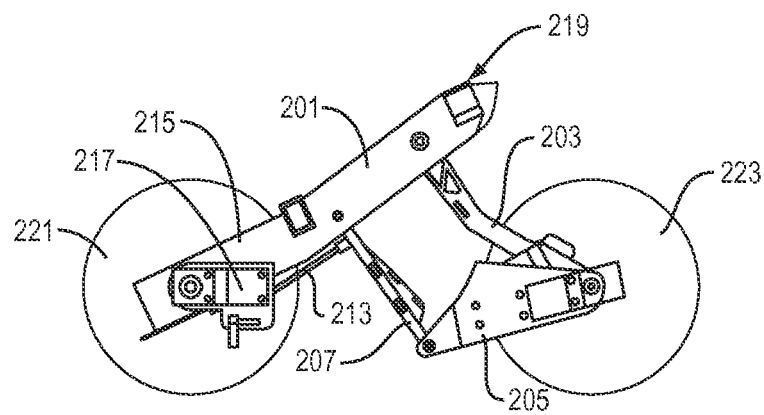
Figure 2C:
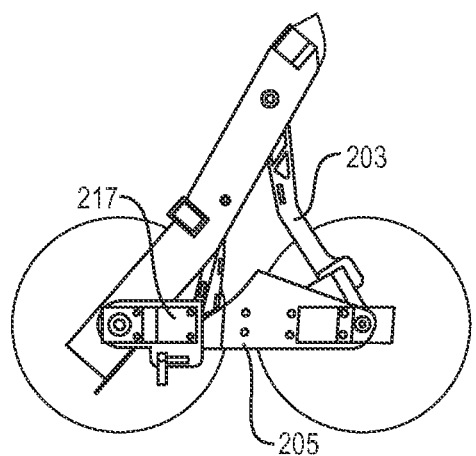

The above Figures show some illustrative implementations of this invention, or provide information that relates to those implementations. However, this invention may be implemented in many other ways. The above Figures do not show all of the details of this invention.

DETAILED DESCRIPTION

FIGS. 1A and 1B are diagrams illustrating a prior art folding car concept for a City Car™. The front wheel 101 as a whole does not move closer to, or further from, the passenger compartment of the car. The back wheel 103 is attached to a single pivot arm 105. As the pivot arm 105 pivots about axis 107, the back wheel 103 moves closer to, or further from, the front wheel 101 of the car. In FIG. 1B, the pivot arm 105 has been rotated clockwise, lifting the main body of the car.

FIGS. 1C and 1D are diagrams illustrating another prior art folding car, in this case, the 1992 Renault® Zoom™. Again, the front wheel 111 as a whole does not move closer to, or further from, the passenger compartment of the car. The back wheel 113 is attached to a single pivot arm 115. As the pivot arm 115 pivots about axis 117, the back wheel 113 moves closer to, or further from, the front wheel 111 of the car. A linear actuator 119 of unknown type (inferred from, but not seen in, some internet photos of the Zoom™) can expand or contract, causing the pivot arm 115 to rotate, and thus causing the car to fold and unfold. In FIG. 1D, the pivot arm 115 has been rotated clockwise, lifting the main body of the car. Actuator 119 is lengthened in FIG. 1C and shortened in FIG. 1D.

The prior art examples in FIGS. 1A, 1B, 1C, 1D exploit a single pivot arm to lift and tilt the body of the vehicle. This method, while perceived simple, is by nature very limited and poses greater technical difficulties in execution. In order to achieve the wheelbase reductions garnered by the proposed invention, a long single pivoting arm is needed, which will lift the majority of the vehicle's mass up significantly, and restrict chassis packaging and steering maneuverability.

In contrast, in exemplary implementations of the current invention, a different solution is employed to reduce the vehicle's wheelbase.

In exemplary implementations of this invention, a dual 4-bar linkage system instead decouples the rear cabin onto the rear 4-bar mechanism which conserves energy since it translates many of the heavy load parts, all while maintaining the relative kingpin (wheel steering axis) position—giving the vehicle total maneuvering capabilities during any state of its fold.

In exemplary implementations of this invention, two 4-bar linkage systems can tilt the front passenger cabin forward while simultaneously contracting its rear storage cabin inward to significantly reduce the vehicle's wheelbase (up to 40%, depending on linkages and vehicle packaging constraints). The dual 4-bar linkage also functions to reduce the amount of mass that is lifted when folding the vehicle. The majority of heavy parts (batteries, motor controllers, and other powertrain parts) remain on the powertrain linkage cross parts and are not elevated during the folding process. This significantly reduces the amount of energy consumed during each fold. The geometric relation and shared linkage between the front and rear 4-bar mechanisms not only (1) work together to fold the vehicle, but also (2) tilt the passenger cabin about the front wheel axis which enables eased front ingress/egress.

In exemplary implementations of this invention, the vehicle can drive and steer normally in both the folded and unfolded position.

In exemplary implementations, the dual 4-bar linkage system comprises two sub-systems—(1) a rear four-link linkage in the rear of the vehicle and (2) a front four-link linkage in the front of the vehicle. The rear four-link linkage helps achieve the reversible reduction in wheelbase. This rear subsystem also acts as the main structural part, tying the front and rear chassis assembly together. The front four-link linkage enables the vehicle to be driven in both folded and unfolded positions (as well as any point in between these two states) and keeps the link mass low. Connected to the rear four-link linkage, the front linkage system maintains the required angle relative to the ground needed to allow the steering mechanism to function properly. Geometries may be chosen that require no further actuation to the front linkage mechanism in order to operate, as its motion is tied to that of the rear linkage.

In some implementations of this invention, the overall assembly is electro-mechanically driven by an integrated push/pull linear actuator, which brings the front and rear wheels towards each other, entering the 'folded' state. Reversing the actuator pushes them back to their original wheelbase, returning to the 'unfolded' position. In addition to folding the vehicle, the actuator acts as a 5th linkage in the rear mechanism—providing added structural integrity and static rigidity. The linear actuator may be non-back-drivable. Such a non-back-drivable linear actuator can firmly lock the assembly when power is not supplied to it, allowing the folding sequence to be halted at any point while maintaining the current angle of cabin tilt. A non-back-drivable actuator is not required for the system to achieve work, but does offer the above stated significant benefits. The system is also compatible with other non-electro-mechanical linear actuators, such as pneumatic pistons; however, a preferred assembly utilizes electric linear actuators for use in a purely electric car.

In exemplary implementations of this invention, a foldable vehicle has a foldable structure. The foldable structure is comprised of the following elements: (1) a rear 4-bar linkage; (2) a front 4-bar linkage; (3) a ladder chassis, and (4) one or more linear actuators. Together, these elements comprise a synchronized folding system that can tilt the vehicle about the front axis, pull in the rear axis to reduce the wheelbase, and keep both the front and rear powertrain level in orientation.

Two prototypes of this invention are illustrated in some of the Figures. FIGS. 2, 3, 6 and 8 show an early prototype of this invention (sometimes referred to herein as an "asymmetric" prototype). FIGS. 4, 5, 7, 9 show a later prototype of this invention (sometimes referred to herein as a "symmetric" prototype).

Figure 3A:
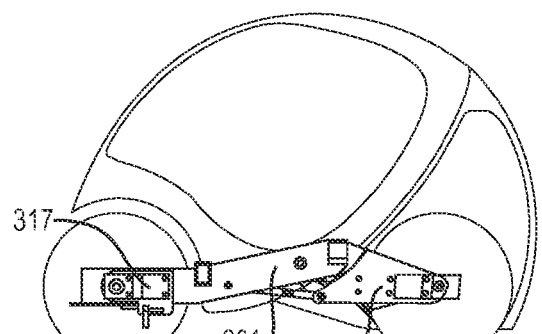
Figure 3B:
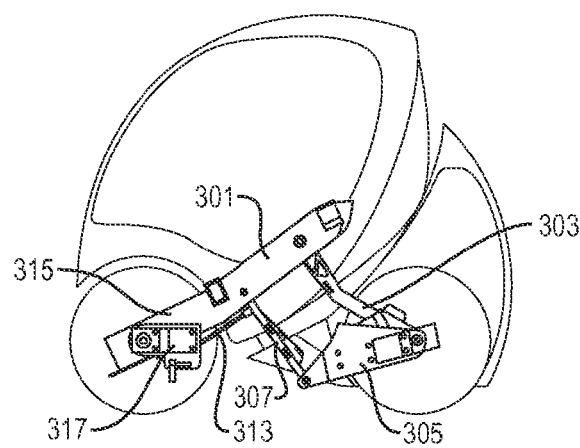
Figure 3C:
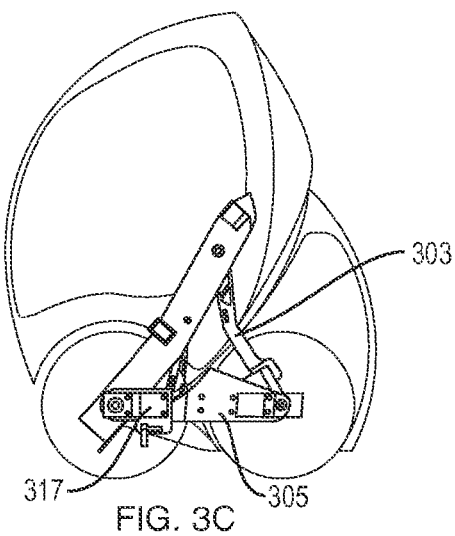

The following is a discussion of these two prototypes:

FIGS. 2A, 2B, 2C, 3A, 3B, 3C show side views of a mechanical linkage system in a so-called "asymmetric" prototype of this invention. In FIGS. 2A, 3A, the wheelbase is fully extended; in FIGS. 2B, 3B, the wheelbase is partially extended; in FIGS. 2C, 3C, the wheelbase is contracted. The rear linkage is a 4-bar linkage, comprising (1) a rear lifting link 203, 303, (2) a rear powertrain link 205, 305, (3) a rear adjusting link 207, 307 and (4) a fourth link 201, 301 (the fourth link 201, 301 is part of ladder chassis 219, 319). The front linkage is a 4-bar linkage, comprising (1) a front synchronizing link 213, 313, (2) a front powertrain link 217, 317, (3) a third link, which third link comprises a portion 215, 315 of the ladder chassis 219, 319, and (4) a fourth link, which fourth link comprises a portion (between 213, 313 and 215, 315) of rear adjusting link 207, 307.

Figure 4A:
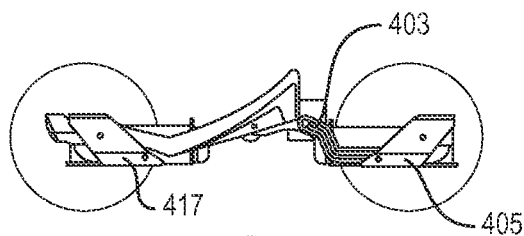
FIGS. 4A, 4B, 4C, 5A, 5B, 5C show side views of a mechanical linkage system in a so-called "symmetric" prototype of this invention.
Figure 4B:
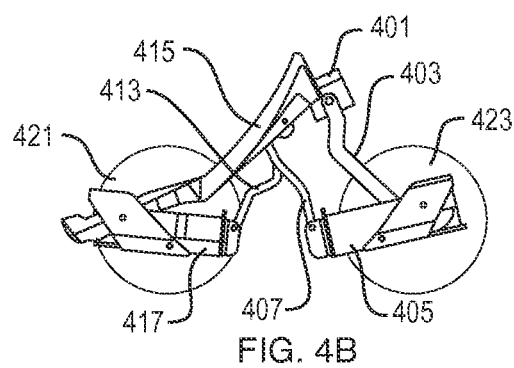
Figure 4C:
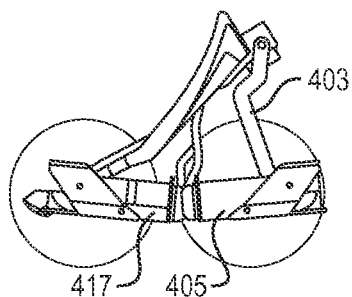
Figure 5A:
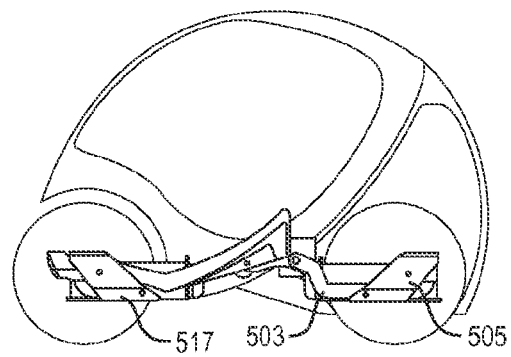
Figure 5B:
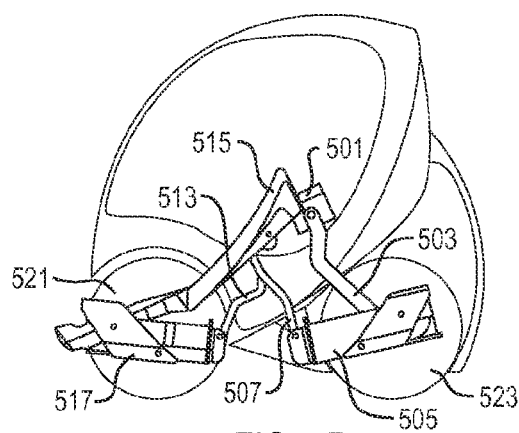
Figure 5C:
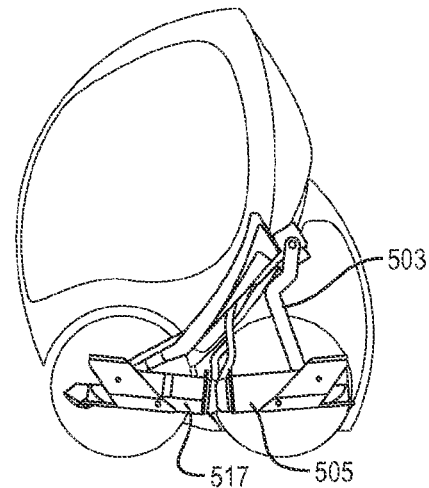

FIGS. 4A, 4B, 4C, 5A, 5B, 5C show side views of a mechanical linkage system in a so-called "symmetric" prototype of this invention. In FIGS. 4A, 5A, the wheelbase is fully extended; in FIGS. 4B, 5B, the wheelbase is partially extended; in FIGS. 4C, 5C, the wheelbase is contracted. Again, the rear linkage is a 4-bar linkage, comprising (1) a rear lifting link 403, 503, (2) a rear powertrain link 405, 505, (3) a rear adjusting link 407, 507 and (4) a fourth link 401, 501 (the fourth link 401, 501 is part of the ladder chassis). The front linkage is a 4-bar linkage, comprising (1) a front synchronizing link 413, 513, (2) a front powertrain link 417, 517, (3) a third link, which third link comprises a portion 415, 515 of the ladder chassis, and (4) a fourth link, which fourth link comprises a portion (between 413, 513 and 415, 515) of rear adjusting link 407, 507.

Figure 6A:
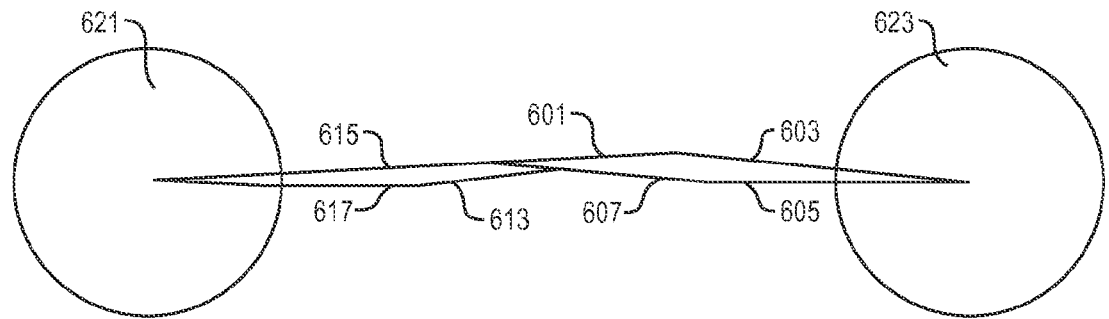
FIGS. 6A and 6B are simplified kinematic diagrams of the linkage system in a so-called "asymmetric" prototype of this invention.
Figure 6B:
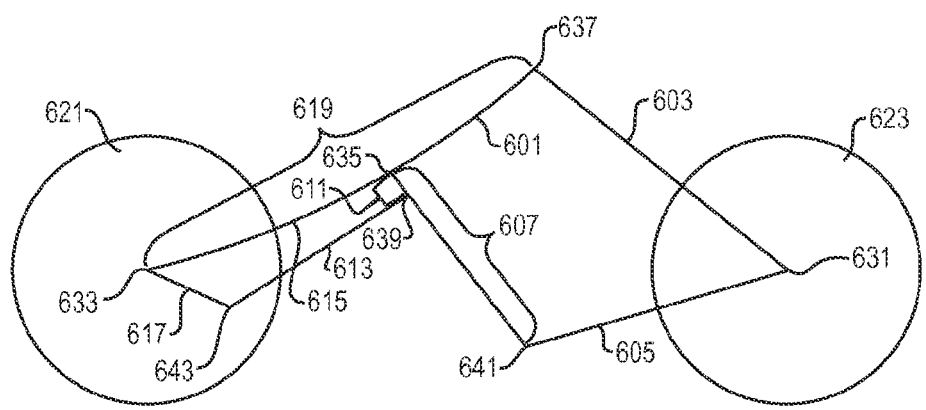

FIGS. 6A and 6B are simplified kinematic diagrams of the linkage system in a so-called "asymmetric" prototype of this invention. In FIG. 6A, the wheelbase is fully unfolded (lengthened); in FIG. 6B, the wheelbase is fully folded (shortened).

Figure 7A:
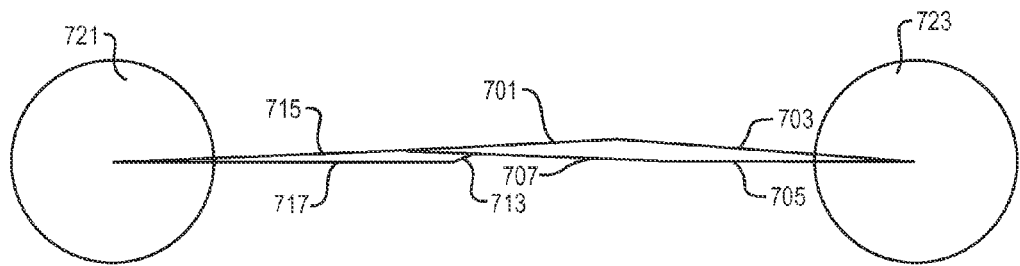
FIGS. 7A and 7B are simplified kinematic diagrams of the linkage system in a so-called "symmetric" prototype of this invention.
Figure 7B:
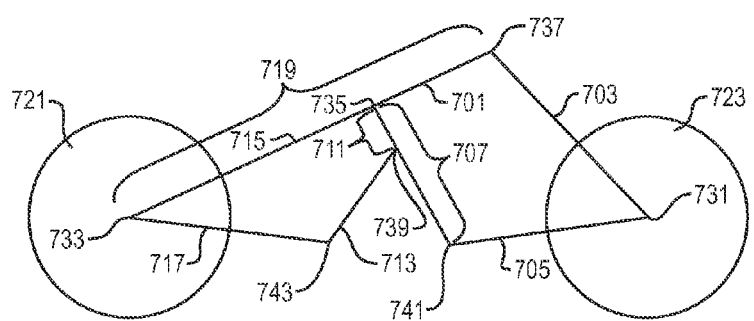

FIGS. 7A and 7B are simplified kinematic diagrams of the linkage assembly in a so-called "symmetric" prototype of this invention. In FIG. 7A, the wheelbase is fully unfolded; in FIG. 7B, the wheelbase is fully folded.

In the two prototypes shown in FIGS. 6 and 7, a rear 4-bar linkage is located at the rear of the vehicle. This rear linkage connects fully to the ladder chassis 619, 719 and can be used to lift and tilt the vehicle forward to reduce vehicle's footprint. This rear linkage assembly comprises four links (the fourth being a portion 601, 701 of the ladder chassis 641, 741).

In the rear linkage of these two prototypes, the rear lifting link 603, 703 is a major structural element that supports the majority of the vehicle's rear load when folded and distributes this load directly to the rear powertrain link 605, 705, which in turn provides mounting points for the vehicle's rear robot wheels (e.g., 623 in FIG. 6, 723 in FIG. 7).

In the rear linkage of these two prototypes, the rear powertrain link 605, 705 helps support parts responsible for powering and driving the vehicle: the battery module, motor controllers, and robot wheels (suspension, drive motors, steering system, and brakes). Therefore, preferably, the base is constructed robustly enough to handle both lateral and torsional forces and vertical loads directly from the weight of the parts. The axis 631, 731 of the joint between the rear lifting link 603, 703 and the rear powertrain link 605, 705 is centered on the axis of rotation of the rear wheel 623, 723, so as to minimize excessive torque requirements when folding the wheels and subsequently rolling the wheels forward.

In the rear linkage of these two prototypes, the rear adjusting link 607, 707 provides significantly less axial load support as most of that support is provided by the rear lifting link 603, 703 that connects the vehicle chassis directly to the rear wheel axle. However the rear adjusting link 607, 707 significantly assists with torsional loads, orientation of the rear powertrain link 605, 705 relative to its vertical axis (keeping it straight, preventing twisting about the z-axis), and leveling the powertrain assembly in both its folded and unfolded state. A section 611, 711 of the rear adjusting link 607, 707 also serves as one of the links for the front 4-bar linkage, so that as the rear 4-bar linkage begins to fold the front 4-bar linkage is simultaneously activated. The length of the rear adjusting link 607, 707 therefore controls rear module "dip" or change of angle mid-fold, as well as front linkage motion based on connection point 639, 739 to the front synchronizing link 613, 713.

In the two prototypes shown in FIGS. 6 and 7, the front 4-bar linkage is located at the front of the vehicle. It helps rotate the front powertrain relative to the ladder chassis, keeping the front powertrain approximately level to the ground. In these two prototypes, the front 4-bar linkage does not serve to reduce the vehicle's wheelbase. However, by keeping the front powertrain approximately level to the ground, the front 4-bar linkage permits the vehicle to maintain driving capabilities while folded (e.g., in some cases, O-turn, translation, and 4-wheel steer). Two of the four parts in the front linkage comprise (1) a portion 615, 715 of the ladder chassis and (2) a section 611, 711 of the rear adjusting link 607, 707 from the rear assembly. The remaining two parts (613, 617 in FIG. 6, 713, 717 in FIG. 7) help to orient and support the font linkage.

In the front linkage of these two prototypes, the front powertrain link 617, 717 behaves similarly to the rear powertrain link 605, 705 supporting crucial drive parts. However, the front powertrain link 617, 717 is connected directly to the ladder chassis 619 at the front wheel axle 633, 733, keeping the front powertrain link 617, 717 more stable and accurately oriented relative to the ladder chassis 619, 719. In some cases, the front powertrain can be identical to the rear powertrain to increase modularity, improve economies of scale and reduced cost. This is however not a requirement for the system to work.

In the front linkage of these two prototypes, the front synchronizing link 613, 713 behaves similarly to and is connected to the rear adjusting linkage 607, 707. Because the front powertrain link 617, 717 is connected directly to the ladder chassis 619, 719 the front synchronizing link 613, 713 does not require as much lateral and torsional support. In some cases, the front synchronizing link 613, 713 has a length adjustment feature to allow tuning between the front and rear powertrain.

In these two prototypes, the ladder chassis 619, 719 comprises two parallel long-running parts with lateral cross-parts that provide the main structure for the vehicle body, seat harnesses, and in reference to the folding system, the pivot connections for each of the 4-bar linkages. From front to back, there are three main axes about which the primary and secondary 4-bar linkages pivot:

First, the front axle pivot 633, 733 is aligned within the center of the front wheels (e.g., 621, 721) and provides the connection to the front powertrain link 617, 717. This is done to achieve similar torque reducing effects as done between the rear powertrain link 605, 705 and the rear adjusting link 607, 707. The left and right pivot connections, along the axis of the front axle pivot 633, 733, remain separated allowing space in-between to accommodate the battery module. These front axle pivot connections must be relatively strong to transmit and distribute the loads from the wheels to the chassis.

Second, the rear adjusting link pivot 635, 735 may remain relatively smaller than the other two since it is transmits lower axial loads.

Third, the rear lifting link pivot 637, 737 provides the connection to the rear lifting link 603, 703 and must be relatively strong to handle the transmitted forces from the rear powertrain assembly. This rear lifting pivot 637, 737 is preferably at least as strong (if not stronger) than the front axle pivot 633, 733, because rear lifting pivot 637, 737 handles significant lateral, torsional and axial loads over a longer moment of the rear lifting link 603, 703.

In these two prototypes, linear actuators are attached to the rear 4-bar linkage vehicle to lift and lower the rear of the vehicle. There are various orientations in which the actuators can be placed. The placement chosen may be dependent on at least two factors—the stroke length of the available commercial actuators, and packaging constraints within the design of the particular vehicle. Depending on the power system(s) available on the particular vehicle, various commercial linear actuator types are compatible for use (electro-mechanical, pneumatic, or hydraulic).

In these two prototypes, electro-mechanical acme screw type linear actuators. These actuators were advantageous for at least four reasons: First, requiring only electrical power to extend and withdraw the actuator rod is opportunely compatible to the core powertrain of an electric vehicle. Other pneumatic and hydraulic type actuators can require peripheral subsystems such as pumps and/or compressors. Second, there are packaging benefits of the electro-mechanical linear actuators, as all required parts can be built in to a cylindrical unit. Third, the actuator does not need discreet position reporting (potentiometer, encoders, etc.) other than end-condition limit switches, as the two prototypes employ a binary fold/unfold system. This aids in simplifying the control of the invention. Fourth, the non-back-drivability of the acme screw type linear actuator adds an important level of stability and safety to the folding system. The actuator behaves as a fifth link in the 4-bar linkage system and locks the assembly rigid, limited only by the holding force before failure, rated by the specific actuator used. Therefore the system only moves when the linear actuator receives power to expand or retract, consequently folding or unfolding the chassis. Linear actuators to fold and unfold the chassis can be placed in multiple orientations.

Figure 8:
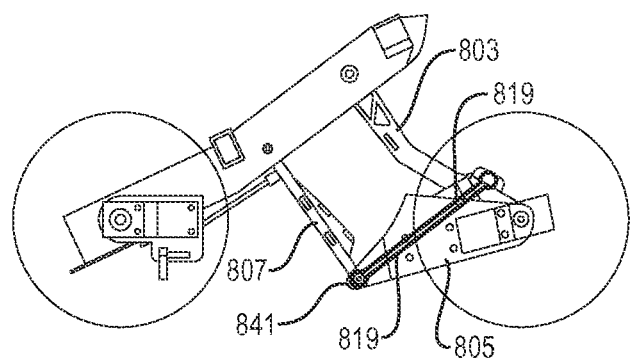
FIG. 8 is a side view, showing a linear actuator attached to two points in a rear linkage.

FIG. 8 is a side view, showing of how a linear actuator may be attached to a rear linkage. In this example, one end of a linear actuator 819 is attached to the rear lifting link 803, and the other end of the linear actuator is attached to a pivot joint 841. Pivot joint 841 joins the rear adjusting link 807 and rear powertrain link 805.

FIGS. 9A, 9B, 9C and 9D are simplified kinematic diagrams that show four examples of how a linear actuator may be positioned for a linkage assembly in a so-called "symmetric" embodiment of this invention.

Figure 9A:
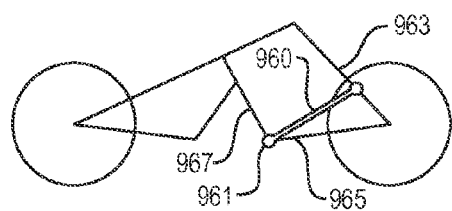
FIGS. 9A, 9B, 9C and 9D are simplified kinematic diagrams that show four examples of how a linear actuator may be attached to a linkage system.

FIG. 9A shows an example of a "push/extend to fold" linear actuator. In FIG. 9A, one end of actuator 960 is attached to pivot joint 961 (between the rear adjusting link 967 and the rear powertrain link 965) and the other end of actuator 960 is attached to rear lifting link 963.

Figure 9B:
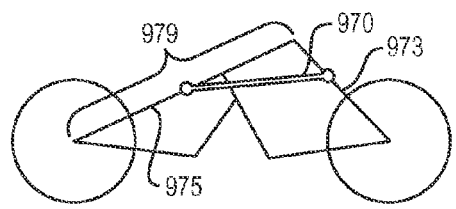

FIG. 9B shows an example of a "pull/withdraw to fold" linear actuator. In FIG. 9B, one end of actuator 970 is attached to a front link 975 of ladder chassis 979 and the other end of actuator 970 is attached to rear lifting link 973.

Figure 9C:
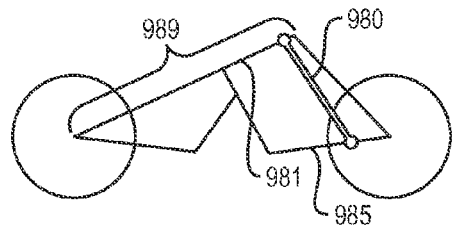

FIG. 9C shows another example of a "push/extend to fold" linear actuator. In FIG. 9C, one end of actuator 980 is attached to a rear link 981 of ladder chassis 989 and the other end of actuator 980 is attached to rear powertrain link 985.

Figure 9D:
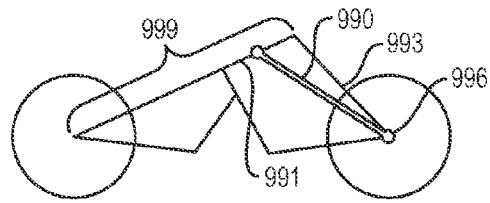

FIG. 9D shows another example of a "pull/withdraw to fold" linear actuator. In FIG. 9D, one end of actuator 990 is attached to a rear link 991 of ladder chassis 999 and the other end of actuator 990 is attached to pivot joint 996 (which is centered on the axis of the rear wheel 993).

If more than one actuator is used, the actuators may operate in parallel.

In the two prototypes shown in FIGS. 6 and 7, the rear 4-bar linkage comprises four links joined by four pivot joints, as follows: (1) a rear lifting link 603, 703 is connected to the ladder chassis 619, 719 at pivot 637, 737; (2) a rear adjusting link 607, 707 is connected to the ladder chassis 619, 719 at pivot 635, 735; and (3) a rear powertrain link 605, 705 is connected to the rear lifting link 603, 703 at pivot 631, 731 and to the rear adjusting link 607, 707 at pivot 641, 741.

In the two prototypes shown in FIGS. 6 and 7, the front 4-bar linkage is comprises four links joined by four pivot joints, as follows: (1) the front powertrain link 617, 717, is connected to the ladder chassis 619, 719 at pivot 633, 733; and (2) the front synchronizing link 613, 713 is connected to the front powertrain link 617, 717 at pivot 643, 743 and to a fourth link 611, 711 at pivot 639, 739. The fourth link 611, 711 comprises a portion of rear adjusting link 607, 707. The fourth link 611, 711 is connected to the ladder chassis 619, 719 at pivot 635, 735.

If non-back-drivable actuators are not used, then locking mechanisms may be used for the end states of folding and unfolding. Registering rest areas, such as bumpers between the mechanical elements, can be used to help distribute the various loads, assisting the assembly to behave as one body when in its driving position.

A variety of manufacturing processes may be used to manufacture this invention. For example, prototypes of this invention have been developed by the following methods: (1) CNC (computer numerical control) laser-cut wood assemblies (2) machined and welded aluminum framing, (3) link and joint aluminum space frame, and (4) blended construction of aluminum and composites (carbon fiber). In some cases, other automotive manufacturing practices such as metal stamping, casting, or forging may also be used to fabricate the folding system.

For small vehicles with wheelbase lengths in the range of 1600-2100 mm, the following proportions are preferred: (a) the length of rear lifting link 603, 703 equals 35% to 45% of the length of the unfolded wheelbase; (b) the length of rear powertrain link 605, 705 equals 30% to 38% of the length of the unfolded wheelbase; (c) the length of rear adjusting link 607, 707 equals 23% to 32% of the length of the unfolded wheelbase; (d) the length of rear link 601, 701 of ladder chassis equals 3% to 8% of the length of the unfolded wheelbase; (e) the length of front powertrain link equals 10% to 38% of the length of the unfolded wheelbase; (f) the length of front synchronizing link equals 16% to 30% of the length of the unfolded wheelbase; (g) the length of front link 615 of ladder chassis equals 33% to 45% of the length of the unfolded wheelbase; and (h) the length of entire ladder chassis 619, 719 equals 54% to 68% of the length of the unfolded wheelbase.

This invention has many practical applications. For example, it may be applied to fleets of folding cars for mobility services. Giving convoys of vehicles the ability to fold has larger ramifications when it comes to vehicle sharing, parking structure design and layout, as well as sidewalk design. In some implementations of this invention, three foldable vehicles are able to fit in the parking space usually allocated for one non-foldable vehicle. Parking density, and thus possible fleet penetration in a mobility-on-demand service can be dramatically increased for those operating these vehicles in such a shared use scenario.

As for the automotive industry, the folding chassis may be employed in alternative energy vehicles, including full electric. Generally, a vehicle chassis, whether it is body-on-frame or uni-body construction, meets the following design goals: (1) behave as the main structural link for link mounting, (2) handle driving dynamics, and (3) manage crash safety.

Also, early empirical experiments of a prototype of this invention demonstrate that the distribution of weight between the front and rear cabin allows the folding mechanism to behave as an energy absorbing link for front and rear impacts/crashes. Exploiting this type of folding chassis in a front or rear impact scenario can reduce the rate of the deceleration in the passenger cabin. Particular linkages may also be strategically designed to compress or fail, acting as dynamic crumple zones, thus reducing crash force transmission to the passenger cabin.

This invention is not limited to 4-bar linkages. For example, this invention may be implemented with any type of linkage, including (1) a planar linkage; (2) a linkage that includes a kinematic loop; and (3) a linkage with a number of links other than four.

In exemplary implementations of this invention: (1) a linkage system bears and distributes at least a majority of the weight of a motorized, wheeled vehicle; (2) the linkage system comprises a front linkage and a rear linkage; (3) the front linkage distributes weight to at least one front wheel of the vehicle; (4) the rear linkage distributes weight to at least one rear wheel of the vehicle; and (5) the two linkages are operatively interconnected, so that a change in shape of one linkage can cause a change in shape of the other linkage.

Different types of linkages may be employed, depending on the particular implementation of this invention. For example, the front and rear linkage systems each, respectively, may comprise, among other things: (a) a four-bar linkage that is a planar linkage; (b) a four-bar linkage that is not a planar linkage; or (c) a planar linkage that is not a four-bar linkage.

In exemplary implementations, one or more actuators are used to actuate the linkage assembly. The actuator(s) actuate, directly or indirectly (including through the linkage system), at least the following motions: (a) changes in shape of the front linkage, (b) changes in shape of the rear linkage, and (c) changes in the wheelbase of the car, such as substantially increasing the wheelbase and substantially reducing the wheelbase of the car. Thus, the actuators actuate the vehicle's folding and unfolding.

In exemplary implementations of this invention, the center of mass of the vehicle does not need to be raised much, if at all, in order to reduce the wheelbase of the car. For example, in some implementations of this invention, the wheelbase may be shortened by a distance that is at least five times greater than the maximum increase in height of the center of mass of the vehicle that occurs during the shortening motion.

Definitions and Clarifications

Here are a few definitions and clarifications. As used herein:

The terms "a" and "an", when modifying a noun, do not imply that only one of the noun exists.

A "change in shape" of a mechanical linkage may occur as a result of motion of links in a linkage relative to each other (e.g., as a result of (i) rotation of links at revolute joints in the linkage, or (ii) sliding of links at a sliding joint in the linkage).

The term "comprise" (and grammatical variations thereof) shall be construed broadly, as if followed by "without limitation". If A comprises B, then A includes B and may include other things.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation.

A "four-bar linkage" is a linkage comprising four links (and no other links) and at least four revolute joints. The links in a "four-bar linkage" may be any type of link, and may be of any size or shape. A link in a "four-bar linkage" is not limited to the shape of a bar. For purposes of the definition of "four-bar linkage": (i) an actuator is not counted as a link; and (ii) a joint is not counted as a link. A "four-bar linkage" may (but does not necessarily) comprise a planar linkage.

In the case of wheels that are included in or operatively connected to a vehicle: a "front" wheel is closer to the front of the vehicle than a "rear" (or "back") wheel. During typical travel, the "front" of a vehicle usually passes over a point before the "rear" (or "back") of the vehicle passes over that point.

The term "include" (and grammatical variations thereof) shall be construed broadly, as if followed by "without limitation".

As used herein, a "kinematic loop" means a set of multiple links, each link in the loop being joined to two other links in the loop by revolute joints. Links in a kinematic loop may or may not also be joined to other links that are not in the kinematic loop.

The term "link" shall be construed broadly to include any rigid element in a mechanical linkage. A "link" may be of any size or shape. Links in a linkage may be of different sizes and shapes. Links in a linkage may be joined in any way that allows the linkage to change shape by movement of the links relative to each other. For example, two links in a linkage may be joined by a revolute joint or sliding joint. The term "link" is not limited to a chain link.

The term "or" is inclusive, not exclusive. For example "A or B" is true if A is true, or B is true, or both A or B are true. Also, for example, a calculation of "A or B" means a calculation of A, or a calculation of B, or a calculation of A and B.

A parenthesis is simply to make text easier to read, by indicating a grouping of words. A parenthesis does not mean that the parenthetical material is optional or can be ignored.

A "pivot" or "pivot joint" in a linkage is a revolute joint. For example, a hinge joint is pivot. Also, for example, any joint that joins two links (which two links can rotate about the axis of rotation of the joint is a revolute joint and thus is also a "pivot" and a "pivot joint".

A "planar linkage" is a mechanical linkage for which a geometric plane exists such that all movement of the links in the linkage, relative to each other, occurs in or parallel to that plane. A linkage may be a planar linkage even though its various links and joints are not all intersected by a single geometric plane.

A "substantial" reduction of a wheelbase occurs when the wheelbase, as of immediately after the reduction, is less than or equal to 0.8333 times the wheelbase, as of immediately before the reduction. A "substantial" increase of a wheelbase occurs when the wheelbase, as of immediately after the increase, is greater than or equal to 1.2 times the wheelbase, as of immediately before the increase.

The "wheelbase" of a vehicle, as used herein, means the instantaneous distance between the center of the front wheel(s) and the center of the back wheel(s) of the vehicle. If the distance varies depending on position (e.g., is greater on the left side than on the right side of a vehicle), then the wheelbase is the instantaneous average of such distances.

Unless the context clearly indicates otherwise: (i) the verbs "connect", "attach", "cause", "distribute", "actuate", and all conjugations of any of the foregoing, shall be construed broadly, as if followed by the phrase "directly or indirectly"; and (ii) similar terms shall be construed in like manner. For example, unless the context clearly indicates otherwise: (1) if A and B are "connected", this means they are connected directly or indirectly, and (2) a "connection" between A and B means a direct or indirect connection between them.

Variations:

This invention may be implemented in many different ways. Here are some non-limiting examples.

This invention may be implemented as apparatus comprising a linkage system and one or more actuators, wherein: (a) the linkage system is configured to bear and distribute a majority of the weight of a motorized vehicle, which vehicle includes or is operatively connected to wheels configured to roll over a surface external to the vehicle, which wheels include one or more front wheels and one or more back wheels; (b) the linkage system comprises a first mechanical linkage and a second mechanical linkage; (c) the first linkage is configured to distribute weight to at least one of the one or more front wheels; (d) the second linkage is configured to distribute weight to at least one of the one more rear wheels; (e) the first linkage is operatively connected to the second linkage; (f) the first and second linkages each, respectively, comprise a planar linkage; and (g) each of the one or more actuators, respectively, is attached to at least one point in the linkage system and is configured to actuate or to help actuate, directly or indirectly, at least the following motions (i) changes in shape of the first linkage, (ii) changes in shape of the second linkage, and (iii) changes in the wheelbase of the vehicle, which changes in the wheelbase include, at some times, a lengthening motion that substantially increases the wheelbase and, at other times, a shortening motion that substantially reduces the wheelbase. Furthermore: (1) the apparatus may further comprise the vehicle; (2) the apparatus may further comprise a set of wheels, which set consists of the one or more front wheels and the one or more back wheels, and at least one wheel out of the set of wheels may be configured for in-wheel steering; (3) at least one wheel out of the set of wheels may be configured for in-wheel propulsion; (4) the changes in the wheelbase may occur within a range of wheelbases, which range has a minimum and a maximum, and the vehicle may be configured to be steerable throughout the entire range, including when the wheelbase is equal to the minimum or when the wheelbase is equal to the maximum; (5) the vehicle may be configured to propel itself by propulsion that, at least at some times, is electrically powered; (6) at least one of the one or more actuators may be a linear actuator; (7) the actuator may be attached to at least two parts in the linkage system, each of which parts, respectively, comprises either a link or a joint that joins links; (8) the actuator may be non-back-drivable; (9) at least part of a link in the first linkage and at least part of a link in the second linkage may be coextensive; (10) a link in the first linkage may comprise a first region in a rigid member, a link in the second linkage may comprise a second region in the rigid member, and the first and second regions may be, at least in part, not coextensive; (11) at least one of the links in the first or second linkages may be configured to have an adjustable length; (12) the shortening motion may shorten the wheelbase by a distance that is at least five times greater than the maximum increase in height of the center of mass of the vehicle that occurs during the shortening motion, height being relative to the external surface; and (13) a first link may be included in the first linkage, a second link may be included in the second linkage, and the first and second links may be mirror symmetric about a geometric plane that intersects the vehicle.

This invention may be implemented as apparatus comprising a linkage system and one or more actuators, wherein: (a) the linkage system is configured to bear and distribute a majority of the weight of a motorized vehicle, which vehicle includes or is operatively connected to wheels configured to roll over a surface external to the vehicle, which wheels include one or more front wheels and one or more back wheels; (b) the linkage system comprises a first mechanical linkage and a second mechanical linkage; (c) the first linkage is configured to distribute weight to at least one of the one or more front wheels; (d) the second linkage is configured to distribute weight to at least one of the one more rear wheels; (e) the first linkage is operatively connected to the second linkage; and (f) each of the one or more actuators, respectively, is attached to at least one point in the linkage system and is configured to actuate or to help actuate, directly or indirectly, at least the following motions (i) changes in shape of the first linkage, (ii) changes in shape of the second linkage, and (iii) changes in the wheelbase of the vehicle, which changes in the wheelbase include, at some times, a lengthening motion that substantially increases the wheelbase and, at other times, a shortening motion that substantially reduces the wheelbase. Furthermore: (1) the apparatus may further comprise the vehicle; (2) the apparatus may further comprise a set of wheels, which set consists of the one or more front wheels and the one or more back wheels, and at least one wheel out of the set of wheels may be configured for in-wheel steering; and (3) at least one wheel out of the set of wheels may be configured for in-wheel propulsion.

This invention may be implemented as apparatus comprising a linkage system and one or more actuators, wherein: (a) the linkage system is configured to bear and distribute a majority of the weight of a motorized vehicle, which vehicle includes or is operatively connected to wheels configured to roll over a surface external to the vehicle, which wheels include one or more front wheels and one or more back wheels; (b) the linkage system comprises a first mechanical linkage and a second mechanical linkage; (c) the first linkage is configured to distribute weight to at least one of the one or more front wheels; (d) the second linkage is configured to distribute weight to at least one of the one more rear wheels; (e) the first linkage is operatively connected to the second linkage; (f) the first and second linkages each, respectively, comprise a four-bar linkage; and (g) each of the one or more actuators, respectively, is attached to at least one point in the linkage system and is configured to actuate or to help actuate, directly or indirectly, at least the following motions (i) changes in shape of the first linkage, (ii) changes in shape of the second linkage, and (iii) changes in the wheelbase of the vehicle, which changes in the wheelbase include, at some times, a lengthening motion that substantially increases the wheelbase and, at other times, a shortening motion that substantially reduces the wheelbase. Furthermore, the apparatus may further comprise the vehicle.

CONCLUSION

It is to be understood that the methods and apparatus that are described herein are merely illustrative applications of the principles of the invention. Numerous modifications may be made by those skilled in the art without departing from the scope of the invention.

What is claimed is:

1. Apparatus comprising a linkage system and one or more actuators, wherein:
    (a) the linkage system is configured to bear and distribute a majority of the weight of a motorized vehicle, which vehicle includes or is operatively connected to wheels configured to roll over a surface external to the vehicle, which wheels include one or more front wheels and one or more back wheels;
    (b) the linkage system comprises a first mechanical linkage and a second mechanical linkage;
    (c) the first linkage is configured to distribute weight to at least one of the one or more front wheels;
    (d) the second linkage is configured to distribute weight to at least one of the one more rear wheels;
    (e) the first linkage is operatively connected to the second linkage;
    (f) the first and second linkages each, respectively, comprise a planar linkage; and
    (g) each of the one or more actuators, respectively, is attached to at least one point in the linkage system and is configured to actuate or to help actuate, directly or indirectly, at least the following motions
        (i) changes in shape of the first linkage,
        (ii) changes in shape of the second linkage, and
        (iii) changes in the wheelbase of the vehicle, which changes in the wheelbase include, at some times, a lengthening motion that substantially increases the wheelbase and, at other times, a shortening motion that substantially reduces the wheelbase;
    (h) a first link is included in the first linkage;
    (i) a second link is included in the second linkage; and
    (j) the first and second links are mirror symmetric with respect to each other.

2. Apparatus comprising a linkage system and one or more actuators, wherein:
    (a) the linkage system is configured to bear and distribute a majority of the weight of a motorized vehicle, which vehicle includes or is operatively connected to wheels configured to roll over a surface external to the vehicle, which wheels include one or more front wheels and one or more back wheels;
    (b) the linkage system comprises a first mechanical linkage and a second mechanical linkage;
    (c) the first linkage is configured to distribute weight to at least one of the one or more front wheels;

(d) the second linkage is configured to distribute weight to at least one of the one more rear wheels;
(e) the first linkage is operatively connected to the second linkage;
(f) a first link is included in the first linkage;
(g) a second link is included in the second linkage;
(h) the first and second links are mirror symmetric with respect to each other; and
(i) each of the one or more actuators, respectively, is attached to at least one point in the linkage system and is configured to actuate or to help actuate, directly or indirectly, at least the following motions
  (1) changes in shape of the first linkage,
  (2) changes in shape of the second linkage, and
  (3) changes in the wheelbase of the vehicle, which changes in the wheelbase include, at some times, a lengthening motion that substantially increases the wheelbase and, at other times, a shortening motion that substantially reduces the wheelbase.

3. The apparatus of claim 2, wherein the apparatus further comprises the vehicle.

4. The apparatus of claim 3, wherein:
(a) the apparatus further comprises a set of wheels, which set consists of the one or more front wheels and the one or more back wheels; and
(b) at least one wheel out of the set of wheels is configured for in-wheel steering.

5. The apparatus of claim 2, wherein the first and second linkages each, respectively, comprise a four-bar linkage.

* * * * *